Oct. 29, 1940.  A. LA FATA  2,219,654
GRAFTING DEVICE
Filed Sept. 19, 1938  2 Sheets-Sheet 1
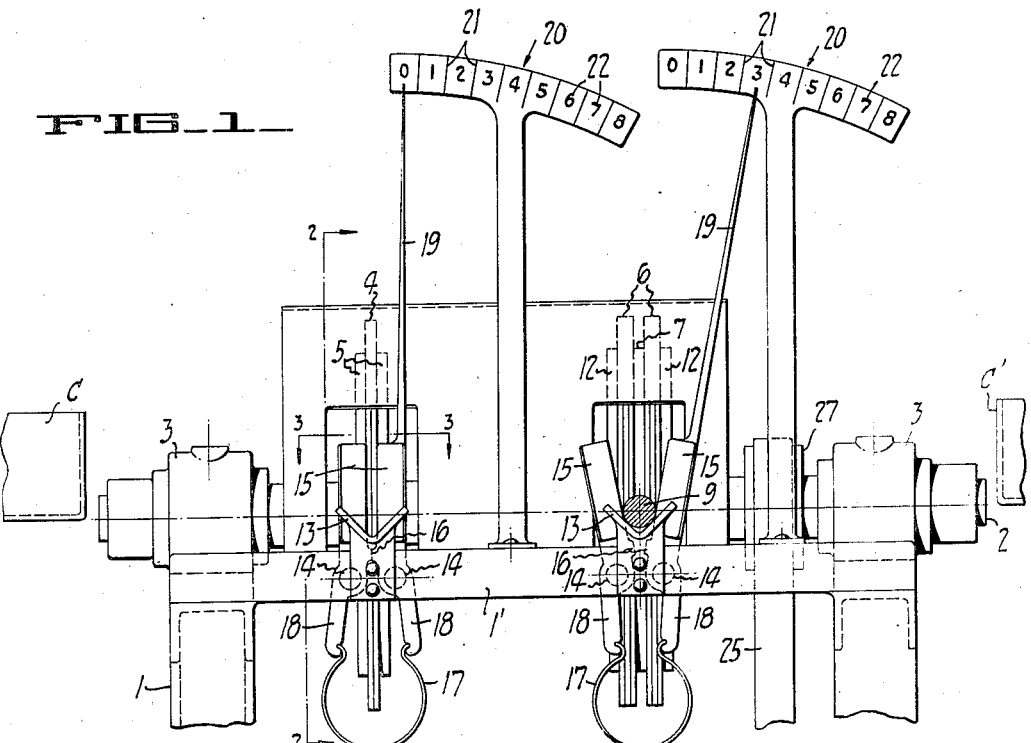
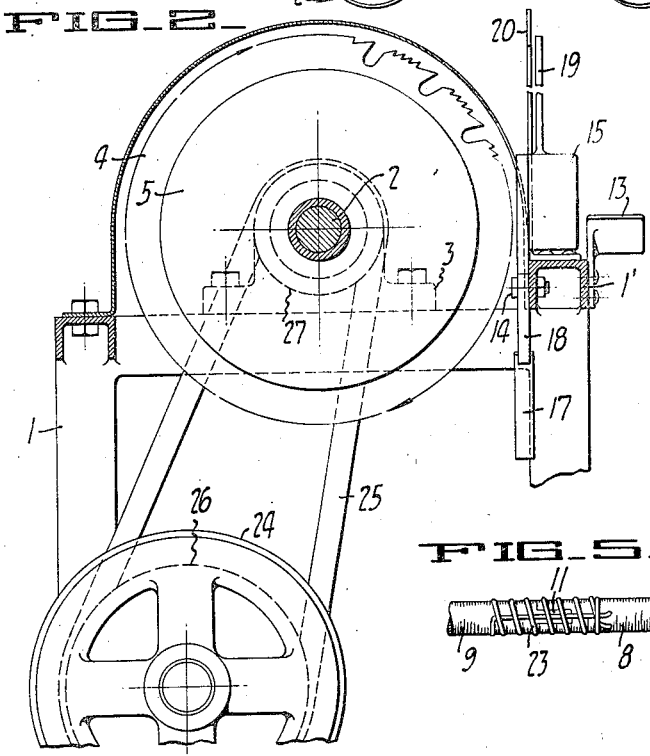
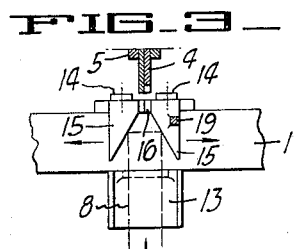
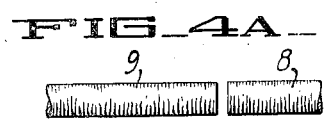
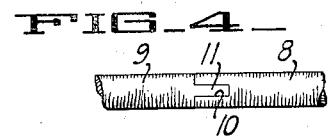
INVENTOR.
Antonio La Fata
BY Boyken & Mohler
ATTORNEYS.

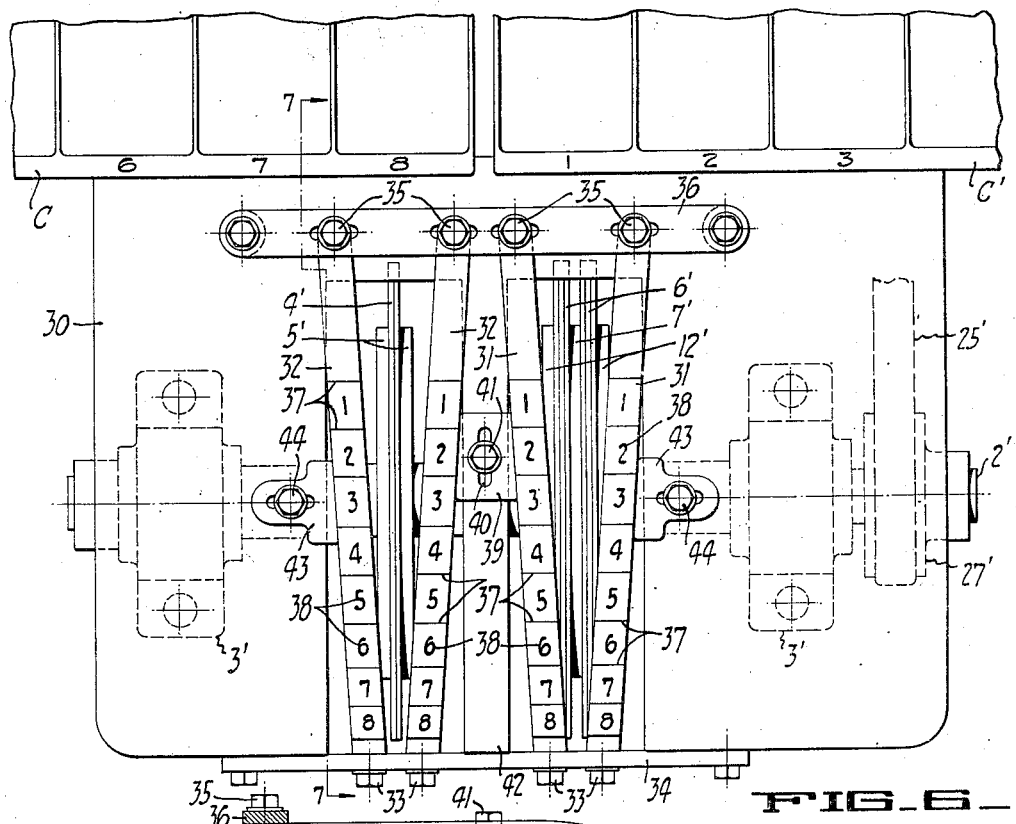

Patented Oct. 29, 1940

2,219,654

UNITED STATES PATENT OFFICE 2,219,654

GRAFTING DEVICE

Antonio La Fata, Merced, Calif.

Application September 19, 1938, Serial No. 230,614

10 Claims. (Cl. 47—6)

This invention relates to a device for preparing scions and stock for grafting.

One of the objects of the invention is a simple device adapted to quickly and efficiently prepare scions and stock for grafting, and which device, at the same time, gages the scions and stock for size for pairing the scions with similar sized stock.

Another object of the invention is improved means for forming one of the ends of scions and stock to provide a stronger and more accurately fitting splice joint than heretofore.

Another object of the invention is a device adapted to classify scions and stock as to size and to form the ends of the scions and stock for grafting together at the same time and which device is constructed to meet unusual conditions that may arise as to the sizes of the scions and stock.

Another object of the invention is a device adapted to quickly and efficiently prepare scions and stock of irregular shapes for grafting together and at the same time visibly indicate the sizes of the scions and stock at the ends that are prepared for joining together whereby the scions may be accurately and quickly paired with the proper sized stock.

Another object is an improved method of more quickly preparing scions and stock for grafting together and also an improved graft construction. Other objects and advantages will appear in the specifications indexed hereto.

In the drawings,

Fig. 1 is an improved elevational view of one of my devices for cutting the scions and stock for grafting.

Fig. 2 is a sectional view as seen along line 2—2 of Fig. 1.

Fig. 3 is an enlarged sectional view of a portion of Fig. 1 as seen along line 3—3 of Fig. 1.

Fig. 4 is a fragmentary elevational view of a joined scion and stock classified and cut by my device.

Fig. 4A is a fragmentary elevational view of the scion and stock before cutting by my device.

Fig. 5 is a fragmentary elevational view of the scion and stock of Fig. 4 wrapped and ready for alignment and planting.

Fig. 6 is a plan view of another form of device adapted for accomplishing the results of the device of Fig. 1, but in a slightly different manner.

Fig. 7 is a sectional view taken along line 7—7 of Fig. 6.

Briefly described my invention is suitable for general use in the grafting of various plants, but I find it particularly suitable for the grafting of grape vines where many thousands of vines are grafted annually for planting vineyards and for replacing vines.

Heretofore, the process of grafting has been relatively slow, and many grafts are imperfect due to differences in the sizes of the scions and stock, and also many failures occur due to the tendency of the conventionally formed joints to separate. The most common grafts are the "splice," the "whip," or "tongue," and the "saddle," these terms being familiar to those skilled in the art, the first form being the one in which the adjacent ends of pieces to be joined are cut straight across the length of each piece at an angle and the cut faces secured together. The "whip" or "tongue" is commonly used in grafting vines, the two pieces being cut across at an angle as in the case of the "splice," but complementary clefts extending generally longitudinally of the pieces are formed in the cut surfaces at the ends for fitting together when the cut faces are placed in engagement and the pieces forced toward each other for sliding along said faces. The "saddle" graft is the form in which the end of the scion or stock is formed with a V-shape channel opening toward the other pieces and said other piece is complementarily formed to fit within said channel. In all of these forms the graft is relatively weak and the surface contact between the cambium layer of the scion with the similar layer of the stock is relatively small and the proper contact is difficult to make without repeated trials and corresponding injury to the parts.

My invention not only enables an operator to cut the scions and stock for rapid assembly, but also provides a strong joint sufficient to insure against dislocation at the joint until the stock and scion have grown together, and further provides for an extensive union between the cambium layers with the exactness required to insure a rapid and strong natural bond between the pieces.

In detail, the device of Figs. 1 to 3, comprises a frame and legs 1 for supporting a horizontal shaft 2 for rotation in ball bearings 3, the shaft preferably being at an elevation about level with the waist of a standing or seated operator. Secured on said shaft 2 is a pair of circular saws 4, said saws being disposed with their adjacent flat sides together, and against the outer sides of the saws are circular disks 5. On the same shaft 2 and spaced from saws 4 is a pair of spaced sets of circular saws 6, said sets of saws being spaced from each other by a pair of circular disks 7 of the same outside diameter as the disks 5 and the thickness of each disk is substantially the width of the cut of each of the saws 4. Also the outside diameter of the saws in said sets is the same as the outside diameter of saws 4.

For convenience of designation, the saws 4 will be termed the "scion cutting" saws, and the sets of saws 6 will be termed the "stock cutting" saws.

The scions 8 and stock 9 normally are cut off square at their adjacent ends, as seen in Fig. 4A. By forcing the square end of scion 8 generally radially of the scion cutting saws 4, and in the plane of the saws, against the cutting edges of said saws, it will be seen that a transverse groove 10 will be cut across the end of the scion of a depth equal to the distance between the peripheries of the saws 4 and disks 5, while by forcing the square ends of the stock radially inwardly of the sets of saws 6 and in the plane of the spacing disks 7, a tongue 11 will be formed on the ends of the stock adapted to fit within the grooves in the scions and the lengths of the tongues will be exactly equal to the depths of the grooves. Since the circumferences of the saws are relatively large as compared with the diameters of the scions and stock, the shoulders on the stock at opposite sides of the tongue are substantially square and closely connect with the outer ends of the scions while the outer ends of the tongues will closely fit against the bottoms of the grooves 11.

Outwardly of the outer sides of the pair of sets of saws 6 are disks 12, similar to disks 5, and the plates 5, 12 may be clamped against the saws 4, 6 and secured on the shaft 2 in the conventional manner, to enable more or less saws 4, or more or less saws 6 to be secured on the shaft for rotation therewith, as desired. Only one saw may be used instead of the pair of saws 4, or the sets of saws 6 may comprise only one saw to each set, or even more than two saws may be used in each instance, as desired, the number of saws used being determined by the character of scions and stock since some plants are obviously larger than others. The use of several saws, as may be desired, for forming the grooves and tongues merely enables the device to be used for different kinds of plants.

In order to insure proper positioning of the scions and stock with respect to saws 4 and the sets of saws 6 respectively, a V-shape supporting member 13 is secured to horizontal frame member 1' that extends transversely across the saws at the side thereof adjacent the operator. Each of these supporting members is formed on its upper surface, between the sides of the V, to provide a relatively short horizontal channel at about the level of the axis of shaft 2, and the bottom of the channel at saws 4 is exactly in line with a medial plane between saws 4, or if only one saw is used, it is in line with a plane exactly bisecting the saw in the plane of the saw. The bottom of the channel formed by the V-shaped member 13 adjacent the sets of saws 6, is exactly in line with a medial plane disposed between the scion cutting saws, thus insuring exact centering of the scions and stock with respect to saws 4, or with respect to the space between the sets of saws 6.

Between the members 13 and the saws adjacent said members respectively, I provide a device for visibly designating the sizes of the scions and stock that are cut, with respect to the diameters of the scions and stock.

The device adjacent the saws 4, for designating sizes, is identical with respect to the device adjacent the stock cutting saws 6, hence the former device will be described in detail, and both devices will bear the same numbers.

This device comprises a pair of vertically extending arms horizontally pivoted at a point intermediate their ends on pivots 14 that are secured to frame member 1'. The upper ends 15 of said arms are vertical, parallel, and are relatively close together, and their adjacent sides extend convergently from their sides adjacent the support 13 and from points at opposite sides of the bottom of the channel formed by the V-shaped member 13. The pivots 14 are at a level below said member 13 and just above said pivots the arms are formed on their adjacent sides with projections 16 with flat adjacent faces adapted to engage each other when the arms are vertical and parallel, while a bowed leaf spring 17 engages at its ends the inner sides of ends of downward extensions 18 on said arms for forcing the extensions 18 apart and the arms 15 toward each other and to vertical parallel relation with the flat adjacent sides of the projections 16 together.

One of the arms 15 is provided with a pointer 19 disposed in upward extension thereof and rigid therewith, which pointer scans an arcuate dial 20 bearing thereon graduations 21 defining a row of zones between graduations, each zone being inscribed to differently identify by letters, numerals or symbols 22, the zones, the embodiment of the invention as shown in Fig. 1 showing numerals from 0 to 8 as designating the zones, the zero zone being the left-hand zone and then the successive zones to the right commencing with the numeral "1." When the arms 15 are vertical and parallel, the pointer is at the zero zone, but as the arms swing apart about pivots 14, the pointer will successively scan the zones.

In operation, the operator first positions a scion and a stock on the channels of members 13 with the butt end facing the saws. The scion and stock are then moved toward the saws and engage the divergent faces of the pair of arms 15 adjacent each of the members 13, thus forcing the arms apart and causing the pointers 19 to scan the dials 20. The pointers will come to rest in one of the zones as soon as the butt ends thereof pass between the arms, and engage the saws, thus clearly designating by the symbol or numeral in said one of the zones, the sizes of the scion and stock, and continued longitudinal movement of the scion and stock will cause the butt ends thereof to engage the saws and to form the groove on the scion, with the square bottom in said groove, and the tongue on the scion, with the square shoulders therein at opposite sides thereof so the tongue may be tightly fitted within the groove with all of the cut surfaces in engagement with each other. The operator, by observing the dials, is apprised of the sizes of the scion and stock, and then places them in the proper compartment bearing the same designations as indicated by the zone identifying numeral or symbol, a series of compartments, one series for the scions, and one for the stock, such as indicated at C, C' at the top of Fig. 6 in the drawings, being provided for this purpose. Thus the joining of equal sized scions with similar sized stock is facilitated, since no sorting or experimental matching is necessary. In other words, the classifying of the scions and stock as to size is accomplished substantially simultaneously with the cutting of the tongues and grooves in the ends thereof, and the graft resulting from joining of the two pieces will be practically perfect in every respect with the cambium layers joining at all points where exposed at adjacent ends of the joined pieces. The operator, after joining the pieces, merely ties the joint together by wrapping a strip of cord or raffia 23 around the same as indicated in Fig. 5.

The shaft 2 is rotated at a high rate of speed, generally from 3000 to 5000 revolutions per minute, by means of a motor 24 and a belt 25, which belt connects between the pulley 26 on the motor shaft and pulley 27 on the shaft 2. The teeth on the saws face the direction indicated in the drawings, so as to tend to force the scions and stock firmly against the supporting members 13, and the shaft is revolved in a direction to cause the teeth to cut downwardly into the scions and stock, as indicated by the arrow in Fig. 2.

This rapid rotation of the saws is essential to prevent any tendency of the saws to tear the scions and stock or to mutilate the cambium layers thereof, and at the same time to insure rapid cutting.

In Figs. 6, 7, another form of device is shown for accomplishing a result similar to that of the device above described, and where similar elements are shown, these bear the same numerals as in Figs. 1 to 3, with the addition of prime marks.

In this form of the invention, shaft 2' carries saws 4', disks 5', sets of saws 6', and disks, 7', 12' the same as described for Fig. 1, and a similar motor 24', with belt 25', drives the shaft and saws.

The shaft 2' is supported in ball bearings from a horizontal platform or frame 30, and below said frame with the saw edges exposed for cutting from above. Extending from one lateral side of the frame, which is the forward side adjacent to which the operator stands, are two pairs of flat straps of metal, the straps of one pair being designated 31 and the straps of the other pair being designated 32. Straps 31 are disposed adjacent the stock cutting saws 6' and straps 32 are adjacent the scion cutting saws 4'.

The straps 32 extend horizontally and convergently from points disposed rearwardly (relative to the forward side of the frame) of the saws 4' toward the forward side of the frame and when about directly over the shaft 2' they curve downwardly along lines substantially following the peripheral contour of the saw and are secured at their forward ends by bolts 33 to a horizontal strip 34 that extends across the forward side of said frame. The rear ends are fastened by bolts 35 to a horizontal strip 36 that is secured to the upper side of the frame. Strips 34, 36 are slotted longitudinally to permit sliding the ends of straps 32 along the strips 34, 36 toward and away from each other upon loosening the bolts 33, 35. Strip 36 shows the slots, which are similar on strip 34. The straps 32 are normally equally spaced from opposite sides of a central vertical plane extending through the scion cutting saws in the plane thereof, and they diverge from their forward ends from said plane at the same angle. A row of zones on the upper sides of said straps are formed by spaced transverse lines 37, the zones being in opposed relation across the plain of the saws, and the correspondingly opposed zones on said straps are identified by numerals or digits 38 of progressively increased value commencing from points on the straps adjacent their rear ends.

Over the sets of stock cutting saws 6' are similarly disposed straps 31 which are similarly numbered, and which straps are marked and secured at their ends in identically the same manner as the first described straps, the markings being designated by the same numerals as are used for straps 32.

Between the adjacent straps of the pair and centrally between saws 4' and the set of saws 6' is a slidably mounted block 39 engaging adjacent sides of said adjacent straps 31, 32, which block is formed with a slot 40 extending longitudinally of the said adjacent straps. A bolt 41 extends through said slot and into a portion 42 of the frame for clamping the block in place, and when so clamped the block supports the said adjacent straps against movement toward each other at a point intermediate the ends of said straps, but upon loosening bolt 41, and the nuts of bolts 33, 35, the said straps may be moved closer together thus widening the spaces between the straps of each pair.

At the outer sides of the outer straps 31 of said pairs of straps are also sliding blocks 43 that are secured to the frame by slot and bolt connections 44 for permitting movement of said outer straps outwardly relative to the inner or adjacent straps of the pairs upon loosening of said bolts of said connections. Thus the straps of each pair will be supported at points intermediate their ends against outward movement relatively while permitting movement of said straps when the blocks 39, 43 are moved to engage the straps adjacent thereto in the adjusted positions of the straps, and then tightened on the frame.

In operation the operator inserts the scions in the space between the straps 32 that are over the scion saws 4' and during cutting of the groove in each scion the scion will move toward the narrowed end of the space between the straps and will stop when the scion engages the converging straps even with one of the zones, thus designating the diameter of the scions, and a similar operation with the stock, but relative to sets of stock cutting saws 6' will cause cutting of the tongues and give a similar classification of the stock as to size thereby permitting rapid grouping of scions and stock respectively in compartments C, C'. The straps of each pair are, of course, secured in similar spaced relation to insure the correct classification.

In the claims, unless otherwise specified the use of the term scion cutting saw, is to be interpreted to mean a pair of saws or a single saw, since the use of the pair of saw blades is merely to enable increasing or decreasing the size of the cut without the necessity of carrying saws of different thicknesses in stock, and in referring to a "pair" of scion cutting saws, this term "pair" refers to a single pair of saws or to a pair of sets of saws, for the same reason given relative to the scion cutting saw, unless the claims specifically refer to more than one saw being in each set of the pair.

Having described my invention, I claim:

1. In a grafting device of the character described, a circular scion cutting saw, means including a revolvable shaft mounting said saw for revolving the same and means for revolving said shaft, scion positioning means positioned outwardly of the periphery of said saw arranged and adapted to automatically position scions of various thicknesses with one of the ends of each scion adjacent the saw and with the longitudinal axis of each scion in the plane of the saw for cutting a recess in the end of each scion by said saw upon movement of the scion toward said saw, stop means at opposite sides of the saw positioned to engage the end of the scion upon predetermined movement of the scion toward the saw for limiting the degree of cutting by said saw, and scion measuring scale means arranged and adapted to visibly indicate the thickness of the scion positioned by said scion positioning means during cutting by the saw.

2. The construction as defined in claim 1, stock cutting means secured on said shaft comprising a pair of spaced circular stock cutting saws, means positioned outwardly of the peripheries of said circular saws arranged and adapted to automatically position stocks of various thicknesses with one of the ends of each stock adjacent the saws and with the longitudinal axis of each stock in a plane parallel with and bisecting the space between said saws for cutting in the end of each stock at opposite sides of said axis, second stop means between said saws positioned to engage the end of the scion upon predetermined movement of the stock toward the saws for limiting the degree of cutting by said saws, and scale means for the stock arranged and adapted to visibly indicate the thickness of the stock when it is positioned for cutting by said stock cutting saws, the space between said stock cutting saws being substantially equal to the thickness of the scion cutting saw whereby the recess cut in the end of the scion by the scion cutting saw will be adapted to receive the tongue of the stock formed between the stock cutting saws when the stock is cut by said saws, and the scale means for the stock being arranged and adapted to indicate thicknesses corresponding to those of the scion measuring scale means for stock of thicknesses similar to the thicknesses of the scions.

3. In a grafting device of the character described, a scion cutting circular saw, a shaft mounting said saw for rotation, means for rotating said saw, scion positioning means arranged and adapted to position scions of various thicknesses for longitudinal movement toward the saw and with their ends adjacent said saw and with their longitudinal axis extending substantially in the plane of the saw and radially of the central axis of the saw whereby upon movement of a scion positioned by said scion positioning means toward said saw the saw will cut a recess in the end of the scion, said scion positioning means including a pair of elongated members disposed in side by side relationship in planes at opposite sides of the central plane of said saw, said members having divergently extending adjacent surfaces arranged and adapted to engage the substantially opposite sides of said scion at points along said surfaces according to the thickness of the scion.

4. In a grafting device as defined in claim 3, a second pair of stock cutting circular saws on said shaft disposed in opposed, parallel relationship on said shaft and spaced apart substantially the thickness of said scion cutting saw, stock positioning means arranged and adapted to position elongated stock pieces of various thicknesses for longitudinal movement toward the saw with their ends adjacent said saw and with their longitudinal axis extending substantially in a plane parallel with and bisecting the space between said stock cutting saws and with the stock extending substantially radially of the central axis of the saw, whereby upon movement of a stock positioned by said stock positioning means toward said saw the saw will cut away the portions of the stock at opposite sides of the central axis thereof leaving a tongue on said axis adapted to closely fit within the recess formed in the end of said scion by the scion cutting saw, and means adjacent said scion cutting saw and adjacent said stock cutting saws arranged and adapted to engage and to restrict to the same degree, the movement of the scion and stock toward the scion cutting saw and stock cutting saws respectively whereby the depth of the groove in the scion and the length of said tongue on the stock will be substantially equal, said stock positioning means including a pair of elongated members disposed in side by side relationship in planes at opposite sides of a plane that is parallel with the planes of said stock cutting saws and that bisects the space between said latter saws, and said members having divergently extending adjacent surfaces arranged and adapted to engage the substantially opposite sides of said stock at points along said last mentioned surfaces according to the thickness of the stock.

5. In a grafting device of the character described, a plurality of circular saws, a shaft to which said saws are centrally secured for rotation therewith on their central axes, means for rotating said shaft and saws, said saws being spaced apart and means for positioning elongated scions and stock outwardly of the saws with their longitudinal axes extending generally radially of the axis of said shaft and with one of their ends adjacent said saws for cutting by the saws upon movement of the scions and stock by the saws, gage means for gaging the widths of said scions and stock comprising member disposed between each of the saws and the stock and scions positioned by the stock and scion positioning means, said gage means being arranged and adapted to be actuated for movement to one side of the path of movement of the scions and stock toward the saws upon moving the scions and stock toward said saws, means movably mounting said gage means for said movement, and a stationary dial positioned for scanning by said gage means upon said movement provided with visible indicating means for indicating the degree of said movement for determining the relative thicknesses of the scions and stock.

6. In combination, cutting means for cutting an interlocking tongue and groove on one of the ends of a scion and stock respectively, indicator means actuated by movement of a scion and a stock to position for cutting by said cutting means arranged and adapted for movement by the scion and stock to distances directly proportional to the thicknesses of the scion and stock for indicating the relative thicknesses of the scion and stock, and a scale positioned for scanning by said indicator means for visibly indicating the distances the indicator means is caused to move by movement of the scion and stock.

7. In combination, cutting means for forming one end of a scion for grafting, scion positioning means for positioning and supporting said scion for longitudinal movement along a path of movement toward said cutting means for cutting thereby, an arm projecting over said path of travel, means pivotally mounting said arm at a point to one side of said path for swinging movement of the arm to one side of the scion upon engagement by the scion during movement of the scion along said path, a pointer movable with said arm upon movement of the arm by the scion, and a graduated scale scanned by said arm for determining the degree of movement of said arm.

8. The combination as defined in claim 7, said cutting means comprising a circular saw and said scion positioning means comprising a generally V-shaped member adapted to support scions of various sizes between the sides of the V whereby the longitudinal axis of various sized scions will be disposed in substantially the same plane with respect to the apex of the V, said V-shaped member being positioned at one side of the saw with the plane of the saw bisecting the V-shaped member through the apex of the V and midway across the space between the ends of said V.

9. In combination, a circular saw for forming one end of a scion for grafting, scion positioning means positioned and arranged and adapted for supporting the scion with its longitudinal axis extending generally radially of the central axis of the saw and with the scion disposed longitudinally substantially in the plane of the saw, said positioning means comprising a pair of divergently extending members positioned outwardly of and equally spaced from opposite sides of the plane of the saw, said members being arranged and adapted to engage opposite sides of scions that are positioned between said members at different points along the lengths of said members according to the thicknesses of the scions, and a scale means on said strips at said different points for designating in different terms said different points whereby the positioning of scions, and the cutting, and the measure thereof will be substantially simultaneous.

10. A grafting machine comprising, in combination, a scion cutting device arranged and adapted to cut a transverse groove in one end of a scion, upon movement of the scion longitudinally thereof toward said device, a stock cutting device arranged and adapted to form on one end of a stock, a tongue adapted to fit in said groove, upon movement of said stock longitudinally thereof toward said stock cutting device, means arranged and adapted to movably support said scion and said stock for said longitudinal movement of the scion and stock for cutting by said scion and stock cutting devices and to position scions and stocks of various thicknesses during said movement with their longitudinal axes centered with respect to the scion and stock cutting devices whereby the said groove and said tongue in each scion and each stock will be centrally positioned at one end of each scion and each stock when cut by the cutting devices, and scale means arranged and adapted to visibly indicate to a reader the thicknesses of scions and stock supported by said first mentioned means during movement of the scions and stock toward the cutting devices to facilitate the fitting of scions and stock of corresponding thicknesses after cutting of the scions and stock by the cutting devices.

ANTONIO LA FATA.